(12) United States Patent
Godet et al.

(10) Patent No.: US 11,203,323 B2
(45) Date of Patent: Dec. 21, 2021

(54) PROCESS FOR DETECTION OF A PORTABLE USER DEVICE IN A PREDETERMINED ZONE ON THE INSIDE OF OR ON THE OUTSIDE OF A VEHICLE BY ULTRA HIGH FREQUENCY, ASSOCIATED DETECTION DEVICE AND ASSOCIATED USER DEVICE

(71) Applicants: CONTINENTAL AUTOMOTIVE FRANCE, Toulouse (FR); CONTINENTAL AUTOMOTIVE GMBH, Hanovre (DE)

(72) Inventors: Sylvain Godet, Toulouse (FR); Frédéric Merlet, Toulouse (FR); Stéphane Billy, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 139 days.

(21) Appl. No.: 16/461,040

(22) PCT Filed: Feb. 7, 2019

(86) PCT No.: PCT/FR2019/050271
§ 371 (c)(1),
(2) Date: Jun. 24, 2019

(87) PCT Pub. No.: WO2019/155167
PCT Pub. Date: Aug. 15, 2019

(65) Prior Publication Data
US 2020/0269810 A1 Aug. 27, 2020

(30) Foreign Application Priority Data
Feb. 9, 2018 (FR) ...................................... 1851099

(51) Int. Cl.
*B60R 25/24* (2013.01)
*G01S 13/76* (2006.01)

(52) U.S. Cl.
CPC .......... *B60R 25/245* (2013.01); *G01S 13/762* (2013.01); *G01S 13/765* (2013.01); *B60R 2325/101* (2013.01); *B60R 2325/105* (2013.01)

(58) Field of Classification Search
CPC ........ B60R 2325/101; B60R 2325/105; B60R 25/245; G01S 13/762; G01S 13/765;
(Continued)

(56) References Cited

U.S. PATENT DOCUMENTS 6,832,075 B1 12/2004 Henry, Jr.
8,989,053 B1 3/2015 Skaaksrud et al.
(Continued)

FOREIGN PATENT DOCUMENTS

CN 1378728 A 11/2002
CN 102740109 A 10/2012
(Continued)

OTHER PUBLICATIONS

Bluetooth-Bluetooth Core Specification, vol. 5.0, Dec. 6, 2016—2822 pages.
(Continued)

*Primary Examiner* — Yong Hang Jiang
(74) *Attorney, Agent, or Firm* — RatnerPrestia

(57) ABSTRACT

A process for detecting a portable user device in a predetermined zone on the inside or outside of a vehicle by a detection device onboard the vehicle. The high-frequency, BLE type communication includes a first signaling mode and a second communication mode, the first mode including: positioning the portable device at a predetermined fixed distance from the detection device, transmitting a signal by the detection device with predetermined transmission power
(Continued)

on a channel. As long as the detection device is receiving a response signal from the portable device, repeating transmission of the signal at the same transmission power on other channels, otherwise, repeating transmission of the signal on a channel with reduced transmission power, and if the detection device no longer receives a response signal, comparing the transmission power to a predetermined threshold transmission power, and applying a correction to the transmission power during the second mode.

14 Claims, 7 Drawing Sheets

(58) Field of Classification Search
CPC ...... G07C 2009/00793; G07C 2209/63; G07C 9/00309; H04B 1/3822
See application file for complete search history.

(56) References Cited

U.S. PATENT DOCUMENTS

| | | | |
|---|---|---|---|
| 9,894,492 B1* | 2/2018 | Elangovan | G07C 9/00309 |
| 10,169,941 B2 | 1/2019 | Menard | |
| 10,564,254 B2 | 2/2020 | Benbouhout et al. | |
| 2004/0142732 A1* | 7/2004 | Ueda | G01V 15/00 |
| | | | 455/569.2 |
| 2014/0188348 A1* | 7/2014 | Gautama | B60W 10/30 |
| | | | 701/48 |
| 2015/0029010 A1* | 1/2015 | Wisnia | B60R 25/209 |
| | | | 340/426.17 |
| 2015/0235486 A1* | 8/2015 | Ellis | G07C 9/00309 |
| | | | 340/5.61 |
| 2017/0006556 A1 | 1/2017 | Liu | |
| 2017/0088072 A1 | 3/2017 | Curtis et al. | |
| 2017/0322287 A1 | 11/2017 | Benbouhout et al. | |
| 2017/0359786 A1 | 12/2017 | Liu | |
| 2018/0302859 A1* | 10/2018 | Elangovan | H04B 17/318 |

FOREIGN PATENT DOCUMENTS

| | | | | |
|---|---|---|---|---|
| CN | 103702391 A | | 4/2014 | |
| CN | 107148070 A | | 9/2017 | |
| CN | 107206967 A | | 9/2017 | |
| CN | 107422306 A | | 12/2017 | |
| EP | 2666310 A1 * | | 11/2013 | ............ H04W 48/04 |
| GB | 2536718 A | | 9/2016 | |

OTHER PUBLICATIONS

Chinese Office Action for Chinese Application No. 201980000502.5, dated Aug. 26, 2021, with translation, 8 pages.

* cited by examiner

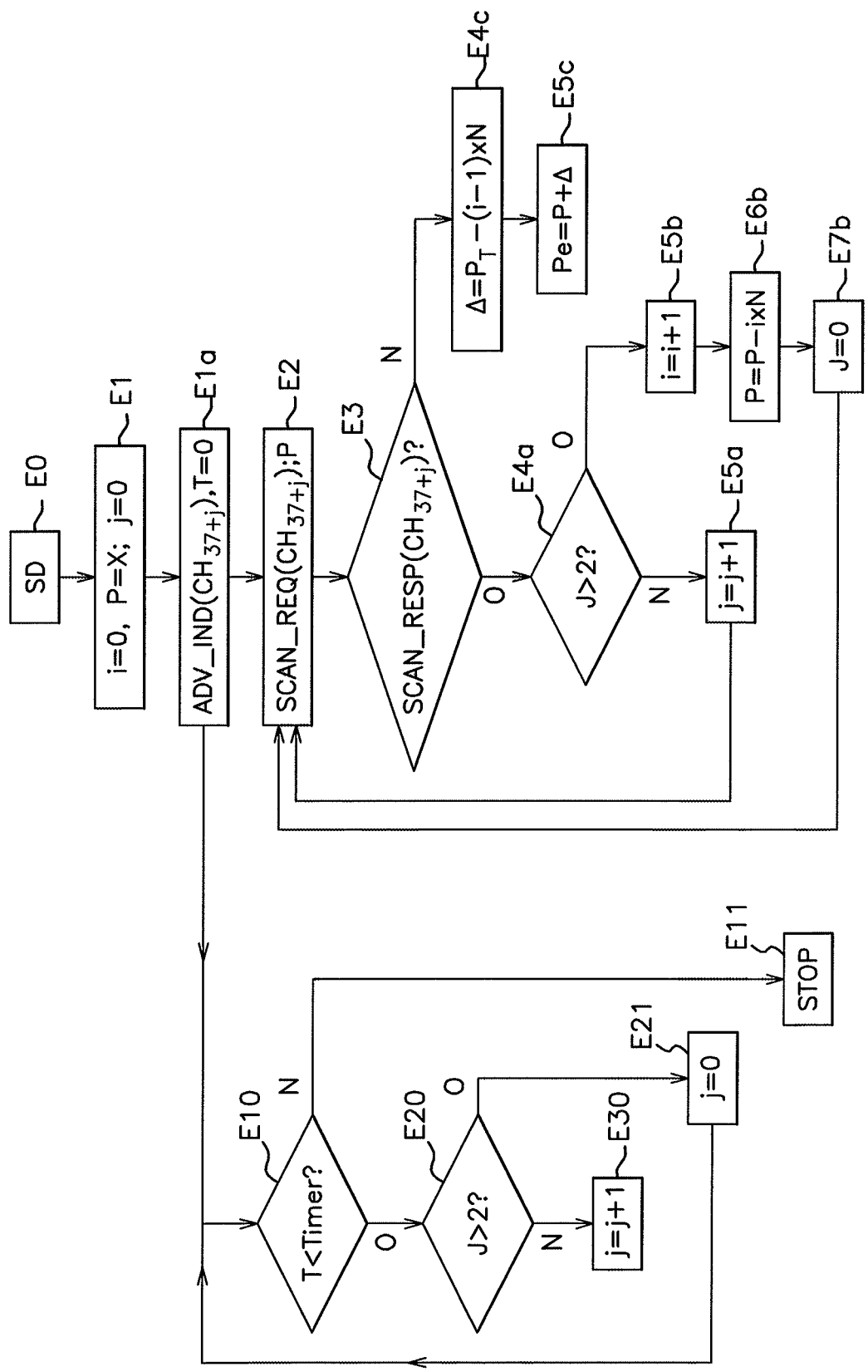

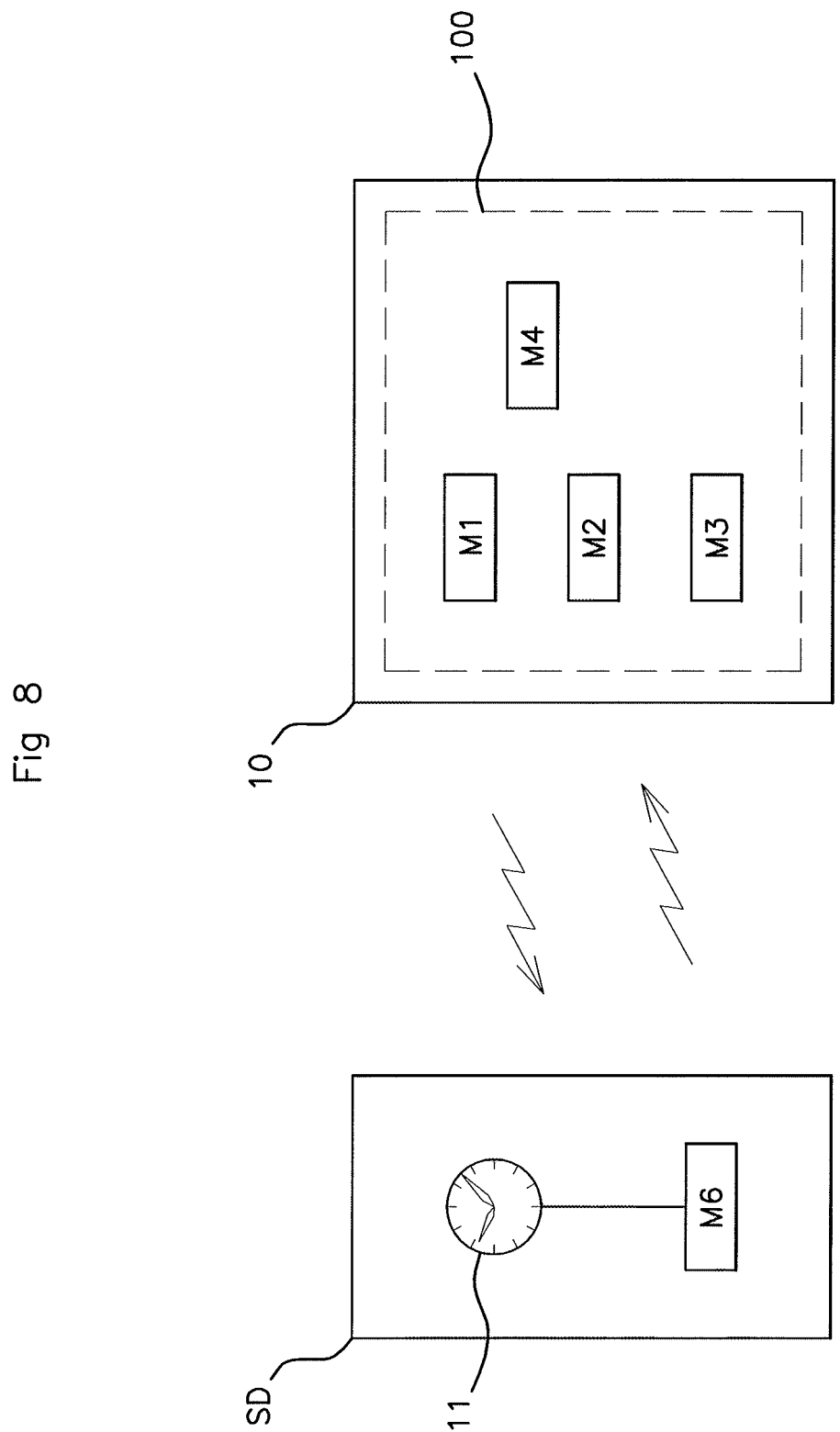

PROCESS FOR DETECTION OF A PORTABLE USER DEVICE IN A PREDETERMINED ZONE ON THE INSIDE OF OR ON THE OUTSIDE OF A VEHICLE BY ULTRA HIGH FREQUENCY, ASSOCIATED DETECTION DEVICE AND ASSOCIATED USER DEVICE

CROSS REFERENCE TO RELATED APPLICATIONS

This application is the U.S. National Phase Application of PCT International Application No. PCT/FR2019/050271, filed Feb. 7, 2019, which claims priority to French Patent Application No. 1851099, filed Feb. 9, 2018, the contents of such applications being incorporated by reference herein.

FIELD OF THE INVENTION

The present invention pertains to the field of automobiles and pertains more particularly to a process for the detection of the presence of a portable user device in a predetermined zone, which is located on the inside of or on the outside of a vehicle, by ultra high frequency, and it also pertains to an associated detection device and an associated user device.

BACKGROUND OF THE INVENTION

Currently, some motor vehicles are capable of communicating with devices carried by the users of these vehicles, such as an electronic contact key or a portable phone (or said "intelligent" phone in French).

The communication between a vehicle V (cf. FIG. 1) and such a portable user device SD makes it possible, for example, to detect the presence of the user U in a predetermined zone ZD around or on the inside of the vehicle V in order to activate certain functions thereof when the user U approaches or moves away from the vehicle. By way of example, these functions may be the locking or unlocking of the interior of the vehicle V, also called "hands-free access" to the vehicle when the portable device SD is located on the outside of the vehicle V, or the hands-free starting of the vehicle when the portable device SD is located on the inside of the vehicle V.

There may be a plurality of predetermined zones, one or more predetermined zones ZD1, ZD2 around the vehicle for authorizing access to the vehicle V and generally a predetermined zone ZD3 on the inside of the vehicle for authorizing the starting of the vehicle V.

In order to detect the presence of a portable user device SD in a predetermined zone ZD1, ZD2, ZD3, the vehicle V periodically transmits, via at least one antenna A, a radio frequency signal comprising a said broadcast message. When the portable user device SD is receiving this radio frequency signal via its onboard antenna, it measures its power, which is called RSSI ("Received Signal Strength Indication") in the known manner and communicates this value to the vehicle V in a transmission signal. The vehicle then uses this power value to estimate the distance D at which the portable user device SD is located in relation to the vehicle V and thus determine the presence or absence of the user U in a predetermined zone ZD1, ZD2 on the outside of the vehicle V or ZD3 on the inside of the vehicle V.

The RSSI measurement of a radio frequency signal makes it possible to precisely locate the portable device SD in the predetermined zones, i.e., around or on the inside of the vehicle V in order to make possible not only the locking/unlocking of doors, but also the starting of the vehicle V, when the device SD is detected on the inside of the vehicle V.

If the portable device SD is a portable phone, the communication with the vehicle in RF (for example, in the ISM bands) and LF (for example, at 125 kHz) is not possible because the majority of portable phones do not have RF and LF communication means.

On the other hand, portable phones nowadays have the Bluetooth Low Energy (BLE) communication standard, i.e., communication at Ultra High Frequency (UHF) from 2400 MHz to 2480 MHz. This communication standard has the advantage of being universal and therefore does not require approval that is specific to each country (only an international Bluetooth Low Energy certification), as is the case with the current RF and LF communication standard, the operating frequency of which differs from one country to the next.

It therefore becomes necessary to adapt the "hands-free" access and/or starting system to a vehicle so that it may also operate with the Bluetooth Low Energy® (BLE) communication standard, incorporated herein by reference, and no longer solely by the intermediary of radio waves and low frequencies (RF, LF).

The advantage of the BLE® communication standard is that it makes possible a far-reaching communication of about 250 m around the vehicle. However, it does not make it possible to precisely detect the presence of the portable device at shorter distances, for example, when the portable device SD is located at a dozen cm from the vehicle V, and when the user wishes to unlock his vehicle. The precise location of the portable device SD, which was possible with the prior-art detection process, operating on an exchange by RF and LF waves, is no longer possible by Bluetooth®. In fact, the RSSI measurement of a Bluetooth signal is very imprecise and varies widely as a function of the environment (noise, disturbances) and it is not possible to know whether the portable device SD, the position of which is fixed, is at 5 m, or 10 m, or 40 m or more from the vehicle V.

In this case, the RSSI measurement varies considerably as a function of the type of portable device SD that is carrying out said measurement.

In fact, under identical conditions of location of the portable device SD in relation to the vehicle V, the RSSI value of the signal received from the vehicle V varies in a nonnegligible manner depending on the type of portable phone, as well as depending on its application software, the version of said software, its immediate environment (presence of a casing on the back of the phone), the position of the BLE antenna in the portable phone, etc.

Therefore, it is no longer possible to start the vehicle using the Bluetooth® communication, because the starting only has to be authorized when the portable device SD is located on the inside of the vehicle V and at a few cm from the UHF antennae of the vehicle. Now, considering the wide variation of the measurement of the RSSI value of Bluetooth® depending on the type of portable phone (its application software, its immediate environment, etc.) that carries out the measurement, the detection of said portable device SD at a few cm from the UHF antennae is not possible.

For example, the portable device SD can be detected on the inside of the predetermined zone ZD3, i.e., in the vehicle V when it is located in the predetermined zone ZD1, i.e., on the outside of the vehicle V.

In this case, starting of the vehicle can be activated when the user is located on the outside of the vehicle V.

Now, the Bluetooth® communication is already an optimized communication protocol vis-á-vis interferences, because it is carried out sequentially on a plurality of channels having different frequencies, which is also called "multi-channel" communication, generally on three channels in order to be the least sensitive possible to exterior disturbances, for example, to disturbances coming from a Wi-Fi communication.

The Bluetooth communication consists, in fact, of the successive transmission of data on three channels $CH_{37}$, $CH_{38}$, $CH_{39}$ having distinct frequencies, for example, on a frequency of 2402 GHz, then of 2426 GHz and finally on 2480 GHz. By multiplying the transmission channels, the probability of interference on the three frequencies at the same time being reduced, communication is assured at least on one frequency.

One possible solution would be to test each new portable phone at the end of its production line in order to measure its measurement sensitivity of the RSSI value in case of BLE. However, in addition to the cost that this represents, this measurement would not prove to be reliable once the portable phone was on the market insofar as a simple update of the application software of said portable phone could modify this sensitivity.

SUMMARY OF THE INVENTION

An aspect of the present invention proposes a process for the detection of a portable user device SD by ultra high frequency in a predetermined zone ZD1; ZD2; ZD3 around a vehicle or on the inside of the vehicle V, which eliminates the above drawbacks.

In this case, an aspect of the present invention pertains to a process of detection by ultra high frequency waves of the presence of the portable device SD on the inside of or on the outside of the vehicle V regardless of the type of portable device SD, said process being carried out in situ and having the advantages of being robust and rapid.

The process of an aspect of the present invention thus makes it possible to detect in a reliable manner the presence of a portable user device in a zone located on the inside of the vehicle regardless of the type of portable device.

An aspect of the present invention proposes a process for the detection of a portable user device in a predetermined zone on the inside of or on the outside of a vehicle by ultra high frequency by means of a detection device onboard the vehicle, said high-frequency, BLE type communication comprising two modes, a said first signaling mode, comprising the transmission by the detection device of at least one signal repeated successively on at least one of three channels and at a fixed frequency for the portable device and requesting a response signal from the portable device on at least one of the three channels, a said second communication mode, in which data are exchanged between the detection device and the portable device on only one dedicated channel, the process being characterized in that the first signaling mode additionally comprises the following steps:

positioning of the portable device at a predetermined and fixed distance from the detection device,
transmission of the signal by the detection device with a predetermined transmission power on a channel,
as long as the detection device is receiving from the portable device a signal of response to said signal on said channel, then repetition of the transmission of the signal at the same transmission power on the other two channels; if not, reduction of the transmission, power of the signal and repetition of the transmission of the signal on a channel with said reduced transmission power, and
if the detection device is no longer receiving a response signal on at least one channel from the portable device, then the transmission power of the last signal sent by the detection device is compared to a predetermined threshold transmission power, and as a function of the result of said comparison, a correction is applied to the transmission power of the signals sent by the detection device during the second communication mode in order to detect the portable device in a predetermined zone.

Practically, the threshold transmission power is determined in advance as a function of the predetermined distance.

Advantageously, the positioning of the phone is carried out on the inside of the vehicle. In a second embodiment of the process according to an aspect of the present invention, after the prior positioning of the portable device and before the step of transmission of the signal by the detection device with a predetermined transmission power, the process comprises the steps:

of transmission by the portable device of a first signal, and
of reception of said first signal by the detection device, the detection process being repeated for each channel as long as a predetermined time has not expired.

The process is characterized in that it comprises the following steps:

Step E0: positioning of the portable device at a predetermined and fixed distance from the detection device,
Step E2: transmission of a signal on a channel by the detection device at a predetermined transmission power,
Step E3: as long as the detection device is receiving a response signal from the portable device on the same channel, then
Step. E4a: if the response signal has been received on each of the three channels, then
Steps E5b and E6b: reduction of the transmission power of the signal and storage of the new transmission power, and
Step E7b: repetition of steps E2 through E4a with the new transmission power,
if not, if the response signal has been received on one channel, then
Step E5a: repetition of steps E2 through E4a for the other two channels,
if not, if the detection device has not received a response signal, then:
Step E4c: if the detection device does not receive a response signal, then calculation of a difference between a predetermined threshold transmission power and the last stored transmission power, and
Step E5c: correction of the transmission power of the signal during the second communication mode based on the difference thus calculated.

Practically, the threshold transmission power is determined in advance as a function of the predetermined distance.

In the second embodiment of the process according to an aspect of the present invention, the process additionally comprises, after step E0, a prior step of transmission of a first signal by the portable device on a channel, and the step comprises a response from the detection device to the portable device by the transmission of the signal on the same channel, the detection process being repeated for each channel as long as a predetermined time has not expired.

An aspect of the present invention also pertains to a detection device onboard a vehicle, comprising Ultra High Frequency communication means, with a portable user device, said high-frequency, BLE type communication comprising two modes, a said first signaling mode comprising the transmission by the detection device of at least one signal comprising a same message repeated successively on at least one of the three channels and at a fixed frequency for the portable device and requesting a response signal from the portable device on at least one of the three channels, a said second communication mode, in which data are exchanged between the detection device and the portable device on only one dedicated channel, said device comprising:

means for reduction of a transmission power of the signal
means for storage of the transmission power,
means for calculation of a difference between the last transmission power stored and a predetermined threshold transmission power, and
means for correction of a transmission power of the signal during the second communication mode based on the difference thus calculated.

Practically, the means for reduction of a transmission power of the signal, the means for storage of the transmission power, the means for detection of the transmission of the signal on each of the three channels at the same transmission power, the means for calculation of a difference between the stored transmission power and a predetermined threshold transmission power, the means for correction of a transmission power of the signal during the second communication mode based on the difference thus calculated are in the form of software integrated in a microcontroller.

An aspect of the present invention also applies to any portable user device, comprising Ultra High Frequency communication means, with a detection device onboard a vehicle, said high frequency, BLE type communication comprising two modes, a first said signaling mode and a said second communication mode, the portable device additionally comprising a clock and means for stopping the signaling mode as a function of a predetermined time.

An aspect of the present invention also pertains to any system comprising a detection device and a portable user device in accordance with any of the features listed above.

An aspect of the present invention also pertains to any motor vehicle comprising a detection device in accordance with any of the features listed above.

BRIEF DESCRIPTION OF THE DRAWINGS

Other objects, features and advantages of aspects of the present invention will appear from reading the description below by way of nonlimiting example and examination of the attached drawings, in which:

FIG. 7 is a flow chart showing the second embodiment of the detection process according to an aspect of the present invention, and FIG. 8 schematically shows the detection device 10 and the portable device SD according to an aspect of the present invention.

DETAILED DESCRIPTION OF THE PREFERRED EMBODIMENTS

Figure 1:
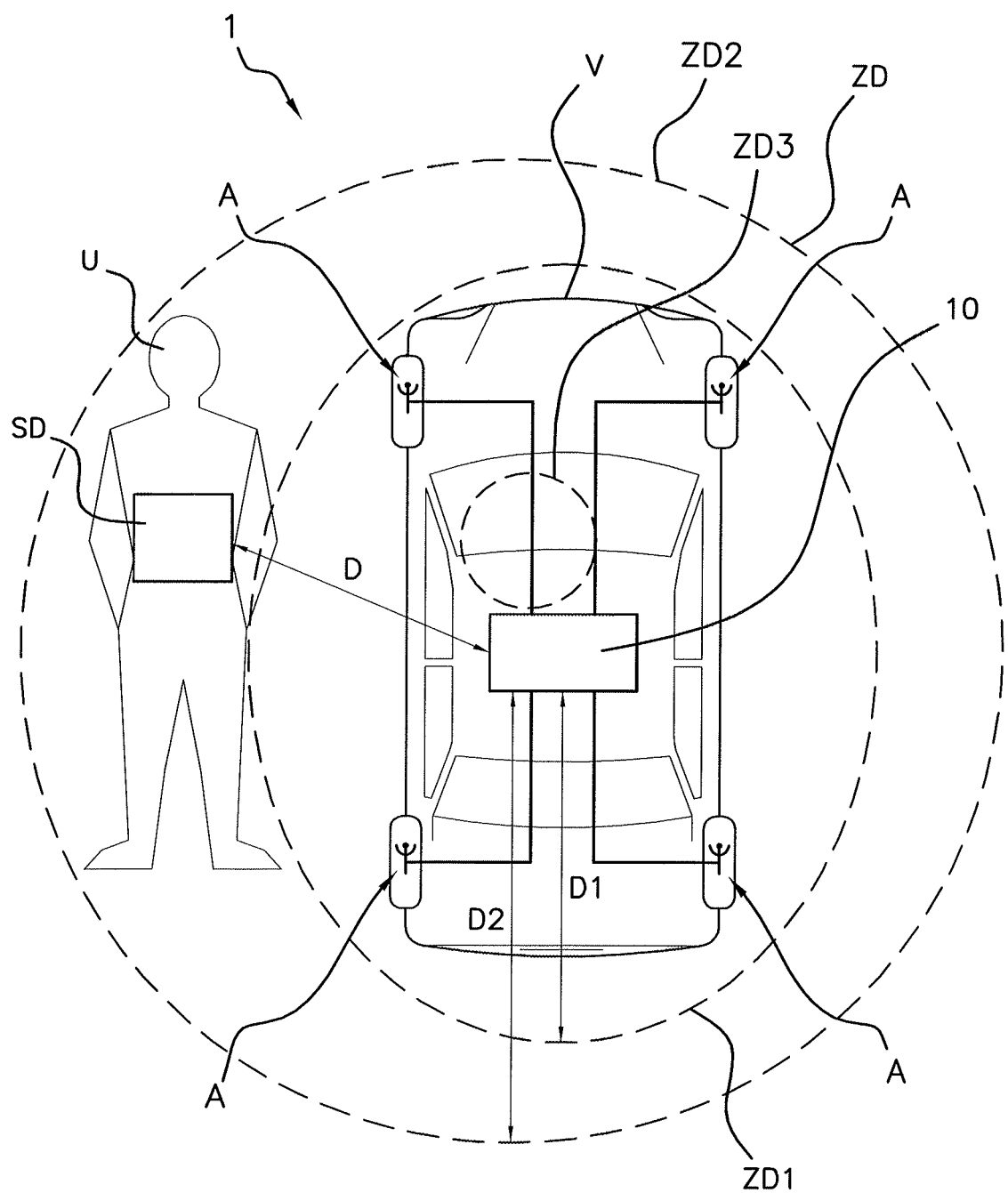
FIG. 1, already explained above, schematically shows a system comprising a vehicle V and a portable user device SD according to the prior art.

FIG. 1 shows a system 1 comprising a vehicle V and a portable user device SD carried by a user U.

The vehicle V comprises a detection device 10 in the form of an electronic control unit of the microcontroller type. The detection device 10 is connected electronically to at least one antenna A located on the vehicle V. Generally, the vehicle V comprises three or four antennae A, which are located, for example, at the level of the doors and are connected to the detection device 10.

The detection device 10 controls, by the intermediary of the antennae A, the transmission of ultra high frequency waves for the portable user device SD.

The antennae A transmit at regular intervals said LF (Low Frequency) waves or a low frequency of 125 kHz. The portable device SD, if it is located on the reception zone of said waves, returns to the vehicle V an RF signal comprising the measurement of the strength of the LF signal that it has received, which is called RSSI ("Received Signal Strength Indication") measurement.

The detection device 10 then determines from this RSSI strength value the distance D separating the portable device SD from the vehicle V.

If the portable device SD is located in a predetermined zone ZD around the vehicle V, some functions are then activated by the vehicle V (automatic unlocking of the door, ignition, lights, interior . . . ).

Only three predetermined zones ZD1, ZD2, ZD3 are shown in FIG. 1 for purely explanatory purposes; however, there may be more than two predetermined zones around or on the inside of the vehicle V, and an action carried out by the vehicle V corresponds to each predetermined zone.

It is hence necessary to know with precision the position of the portable device SD in said predetermined zones ZD1, ZD2, ZD3 in order to avoid, for example, the automatic unlocking of the door if the portable device SD is located in the widest predetermined zone ZD2 around the vehicle V, and to only authorize it if said device is located in the predetermined zone ZD1 closest to the vehicle V. In this case, it is essential only to authorize the starting of the vehicle in "hands-free" mode if the portable device SD is detected in the third predetermined zone ZD3 located on the inside of the vehicle in order to avoid, for example, the starting of the vehicle V when the portable device SD, and hence the user V, are located on the outside of the vehicle V.

This process for the detection of the presence of the portable device SD is known from the prior art and will not be described in more detail here.

As explained above, when the portable device SD and the detection device only communicate by ultra high frequency (UHF) waves, it is then impossible to determine with precision the location of the portable device SD in relation to the vehicle V.

Consequently, considering the variations of the measurement of the RSSI value using BLE between portable devices, it is only possible for a portable device SD to be detected on the inside of the vehicle V, or in the third predetermined zone ZD3, when, in reality, it is located in the first predetermined zone ZD1 when another portable device SD, having a better RSSI BLE measurement sensitivity, would be detected correctly on the inside of the vehicle V. In the first case, the hands-free starting is then authorized when the user U is located on the outside of the vehicle V, which is not acceptable.

An aspect of the present invention proposes a process for the determination of the presence of a portable user device in a predetermined zone on the inside of or on the outside of the vehicle V by ultra high frequency, eliminating the drawbacks of the prior art.

In this case, the detection process according to an aspect of the present invention makes it possible to detect the presence of a portable device SD in a reliable manner regardless of the type of portable device SD used, i.e., regardless of its intrinsic measurement sensitivity of the strength of the BLE signal that it receives.

The detection process applies to the detection device 10 and to the portable user device SD communication with one another by BLE.

BLE is an ultra high frequency communication that can be carried out on 40 channels, each channel having a frequency ranging between 2402 MHz and 2480 MHz at a 2-MHz band.

The BLE communication protocol, which is well known from the prior art, comprises two modes:

a said first signaling mode, comprising the transmission by a transmitter of at least one signal comprising a same message repeated successively on at least one of the three dedicated channels $CH_{37}$, $CH_{38}$ and $CH_{39}$ and at a fixed frequency for one or more receivers and requesting a response signal from at least one receiver on at least one of said three channels, and a said second communication mode, in which data are exchanged between the transmitter and the receiver having responded on only one dedicated channel, this channel being one of the remaining 37 channels dedicated to BLE communication.

Figure 3:
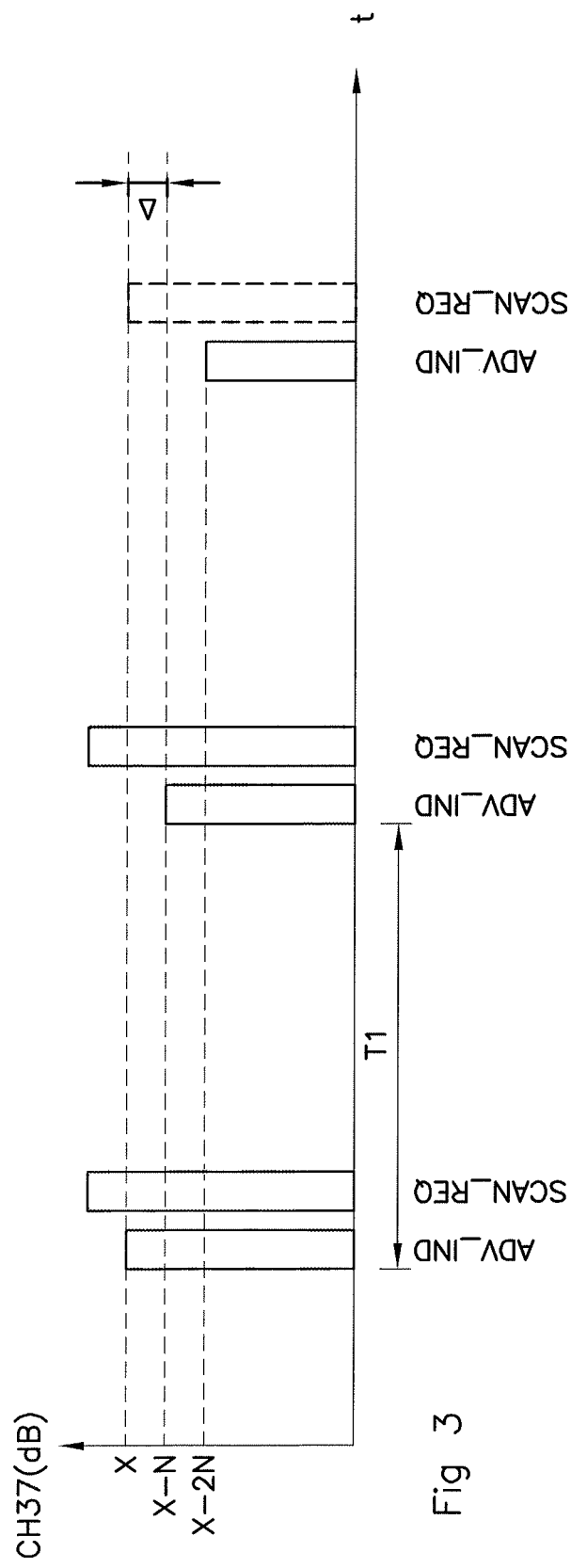
FIG. 3 is a graph showing the transmissions of signals from the detection device as a function of time, on only one channel, which is given by way of example, according to a first embodiment of the detection process of an aspect of the present invention, i.e., when the vehicle triggers the first signaling mode according to the BLE protocol.

The signaling mode can be initiated by the detection device 10 by sending a signal called "ADV_IND" on a channel, for example, on the channel 37, $CH_{37}$ as shown in FIG. 3. Upon reception of this signal, the portable device SD responds by a "SCAN_REQUEST" signal. Then, upon reception of this "SCAN_REQUEST" signal, the detection device 10 in turn responds by a signal called "SCAN_RESPONSE."

Figure 4:
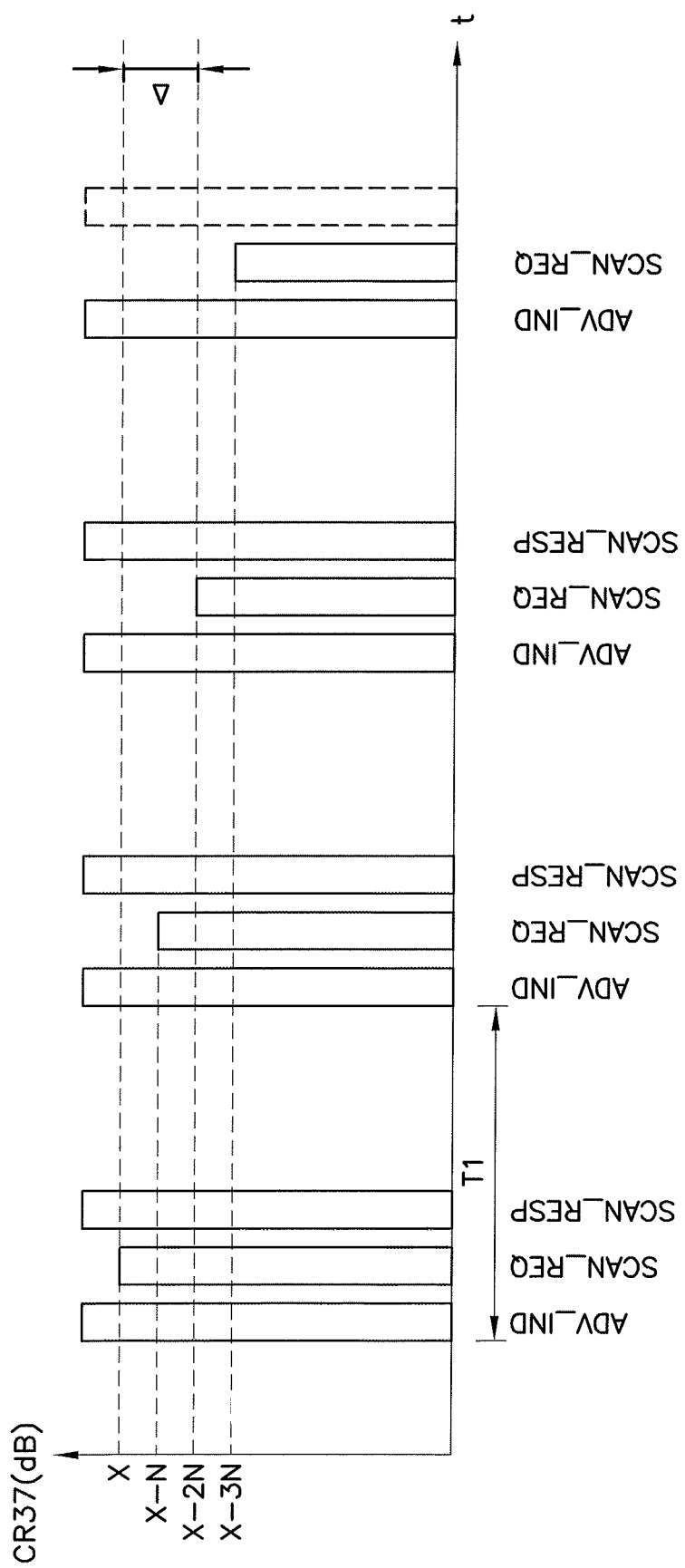
FIG. 4 is a graph showing the transmissions of signals from the portable device as a function of time, on only one channel, which is given by way of example, according to a second embodiment of the detection process of an aspect of the present invention, i.e., when the portable device triggers the first signaling mode according to the BLE protocol.

The signaling mode may also be initiated by the portable device SD. In this case, the portable device SD sends the "ADV_IND" signal on a channel, for example, the channel 37, $CH_{37}$ as shown in FIG. 4, then the vehicle V, by the intermediary of the detection device 10, upon reception of said first signal, responds by sending the "SCAN_REQUEST" signal, then upon reception of this signal, the portable device SD in turn responds by a "SCAN_RESPONSE" signal.

This protocol of exchanging BLE signals between the transmitter and the receiver is known to the person skilled in the art and will not be described in more detail here. In addition, the data contained in these exchanges are dictated by the BLE protocol.

It is important to note that the BLE signaling mode does not permit exchanges of bidirectional data between the vehicle V and the portable device SD; it is only a protocol for recognizing the presence of a compatible device, i.e., capable of BLE communication, being located near or in the BLE frequency range of another device transmitting to it also at the BLE frequency.

During the BLE signaling mode, no function of the vehicle V may be triggered, and no location of the portable device SD on the inside of or on the outside of the vehicle V may be carried out.

In fact, the detection of the presence of the portable device SD in a predetermined zone ZD1, ZD2, ZD3 on the inside of vehicle V or on the outside of the vehicle V is carried out during the communication phase, which starts once the signaling phase has been successfully carried out, i.e., once the mutual recognition between the two objects, the detection device 10 and the portable device 10, capable of BLE communication between one another has been carried out.

If the exchange of signals fails on a first channel (for example, $CH_{37}$); in other words, if the "SCAN_REQUEST" or "SCAN_RESPONSE" signal has not been received by the transmitter or the receiver, respectively, and according to the BLE protocol, the signaling mode comprises the repetition of the exchange of signals on a second channel ($CH_{38}$), then on a third channel ($CH_{39}$), until the mutual recognition of the presence of a compatible device is carried out on each side between the transmitter and the receiver on at least one channel. The repetitions are spaced apart for a time t1 ranging between 20 msec and 10.24 sec (cf. FIG. 2).

Figure 2:
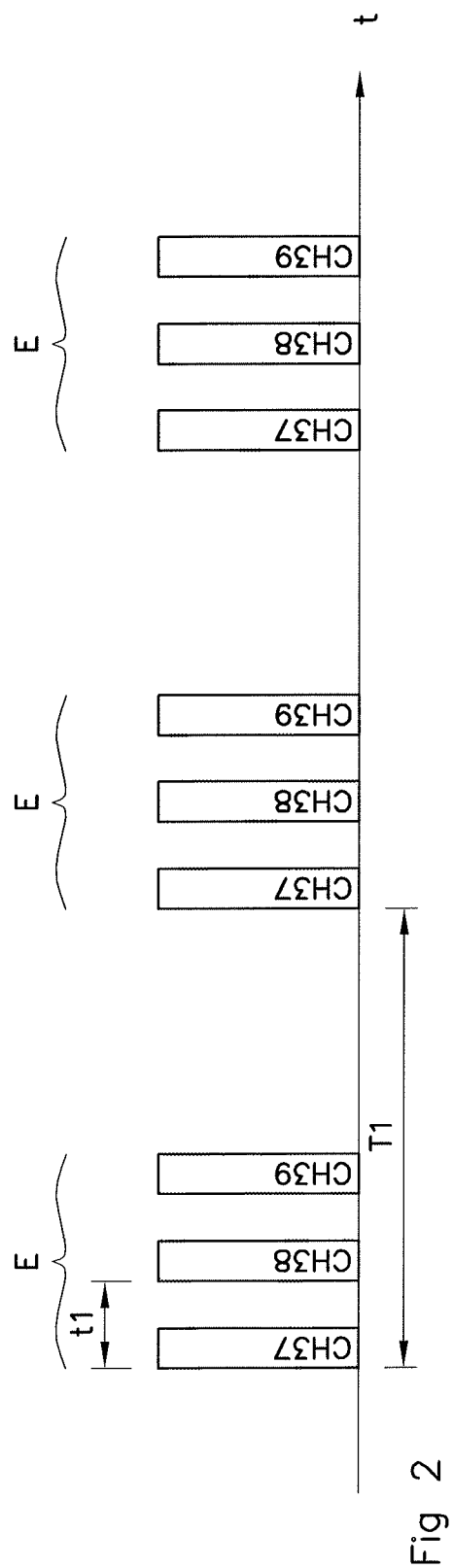
FIG. 2 is a graph showing the transmission of signaling signals according to the BLE communication protocol as a function of time.

These exchanges of signals are repeated successively for each of the three channels dedicated to the signaling mode communication, i.e., on the channels $CH_{37}$, $CH_{38}$ and $CH_{39}$. This is shown in FIG. 2 and in FIG. 4. Each $CH_{37}$, $CH_{39}$, $CH_{39}$ block shown in FIGS. 2 and 4 represents the transmission of the three signals among the "ADV_IND," "SCAN_REQUEST" and "SCAN_RESPONSE" signals on its respective channel. Then, all three blocks of signals E are then repeated at a fixed frequency, for example, for a time T1=100 msec (cf. FIG. 2).

The signaling mode can then lead to a bidirectional communication mode, in which the transmitter and the receiver communicate on a dedicated channel, i.e., on one of the remaining 37 BLE frequency channels.

In this case, the signaling mode between the detection device 10 and the portable device SD can be followed by a communication mode which comprises exchanges of data at the BLE communication frequency. This additionally makes possible the authentication and the location of the portable device SD by the detection device 10 in order to trigger certain functions in the vehicle V (unlocking of the doors, hands-free starting).

The detection process according to an aspect of the present invention practically proposes using the signaling mode that is specific to the BLE protocol in order to correct the measurement sensitivity of the BLE signal of the portable device SD. The process according to an aspect of the present invention advantageously makes it possible to eliminate the RSSI measurement sensitivity disparities of the BLE signal between the portable devices SD and even before this a bidirectional communication is possible between said portable device SD and the vehicle V. Thus, the measurement sensitivity of the strength of the BLE signal of the portable device SD is corrected before any communication, the precision on the detection of the portable device SD in the predetermined zone ZD1, ZD2, ZD3 carried out during the communication phase is hence improved and makes it possible to trigger the corresponding vehicle function.

In this case, the process according to an aspect of the present invention is particularly pertinent for the detection of the portable device SD on the inside of the vehicle V (predetermined zone ZD3) in order to authorize the hands-free starting, which is not possible with the processes of the prior art.

Figure 5:
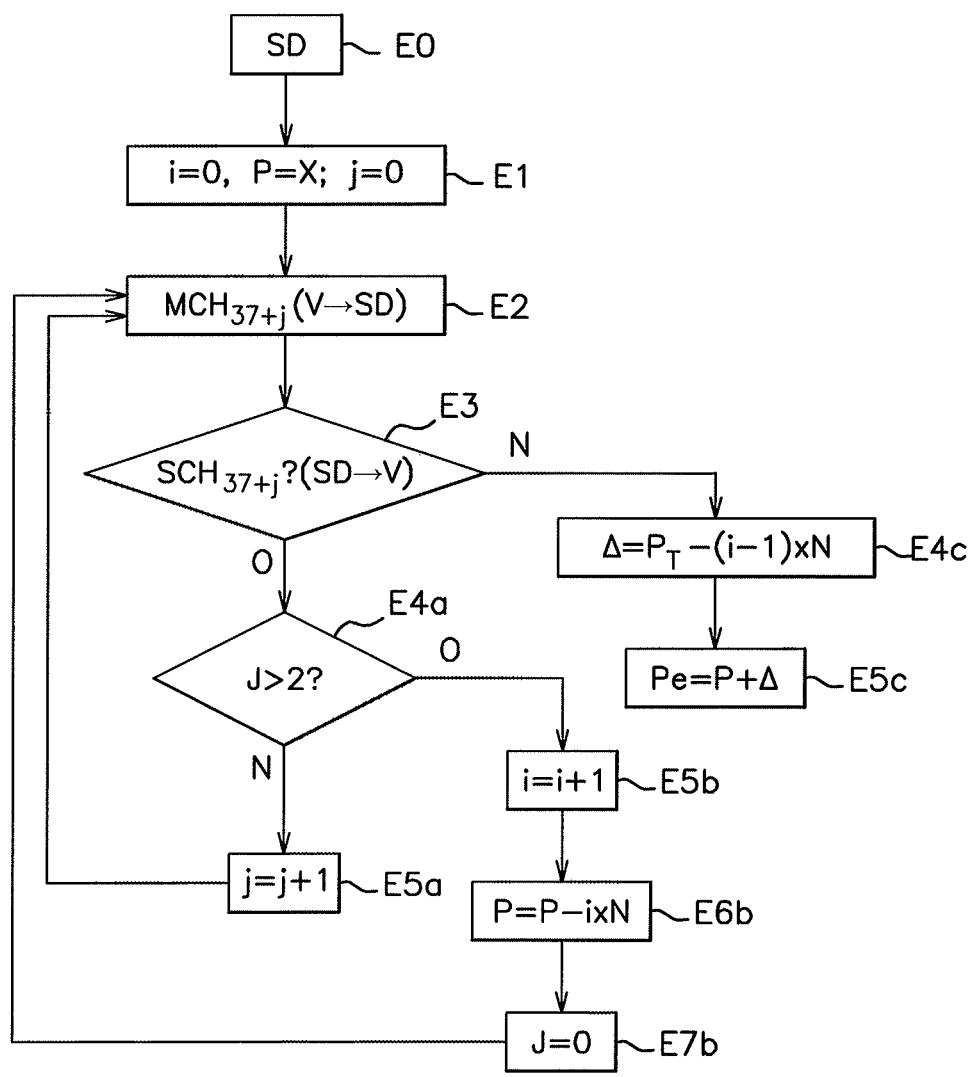
FIG. 5 is a flow chart showing the detection process according to an aspect of the present invention.
Figure 6:
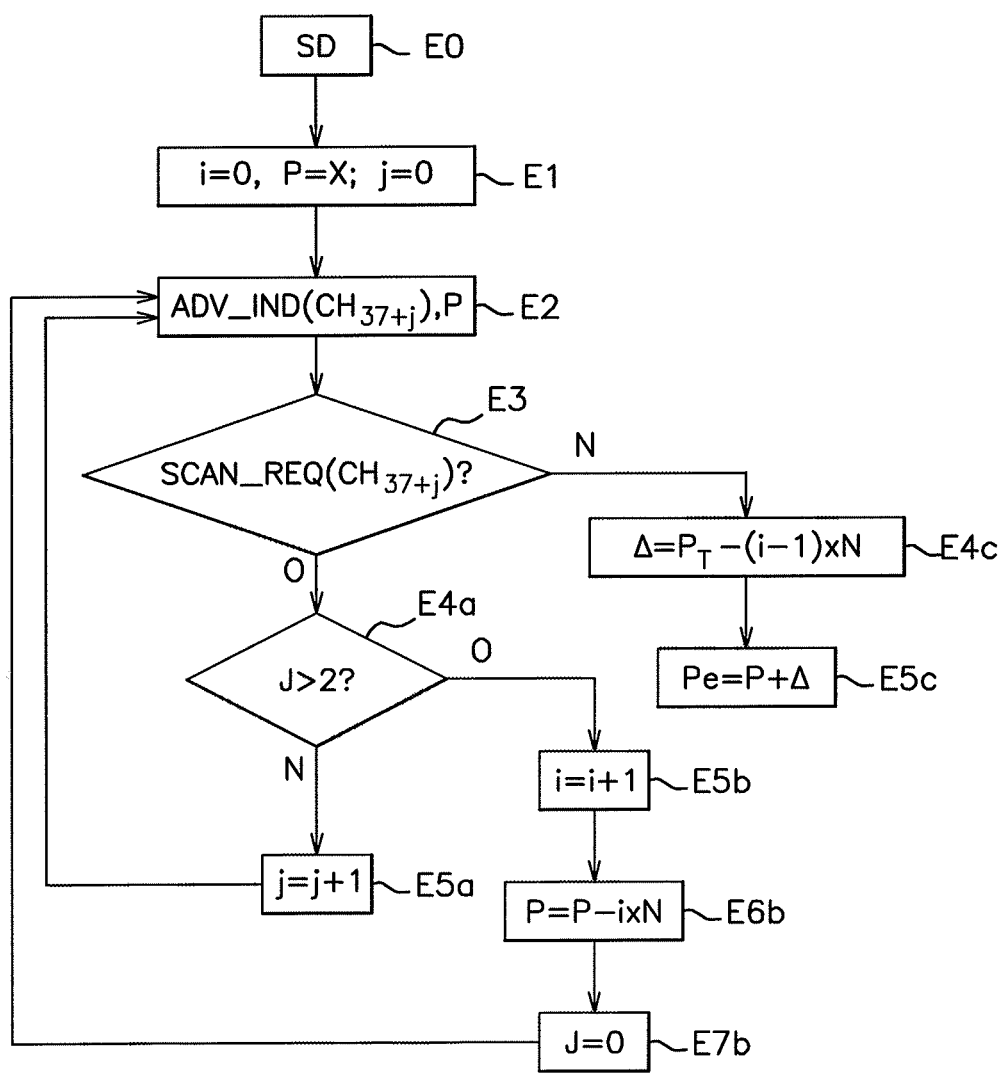
FIG. 6 is a flow chart showing the first embodiment of the detection process according to an aspect of the present invention.

For this purpose, the detection process according to an aspect of the present invention is shown in FIGS. 5, 6 and 7, and proposes at a first time to position the portable device SD at a predetermined and fixed distance from the detection device 10 (step E0), for example, on the inside of the vehicle V, on a central console located between the two front seats of the vehicle near the gear shifter.

The predetermined and fixed distance may be such that the portable device SD is placed on the outside of the vehicle.

The BLE signaling mode is then triggered either in a passive manner, the BLE always being activated in the detection device 10 and in the portable device SD, or in an active manner by the user who, himself, triggers the BLE communication mode by the intermediary of an application on his portable device SD and on the vehicle V by pushing, for example, a dedicated button. This is known from the prior art.

In a first embodiment of the detection process according to an aspect of the present invention and shown in FIG. 6, the signaling mode is triggered by the detection device 10.

The detection device 10 transmits the "ADV_IND" signal with a predetermined transmission power, P=X in decibels (step E2) on a first channel $CH_{37}$, or $CH_{37+j}$, with, for example, j=0 (step E1).

In step E3, as long as the detection device 10 is receiving a response signal from the portable device SD, i.e., as long as the detection device 10 is receiving the "SCAN_REQUEST" (or also called "SCAN_REQ") signal from the portable device SD on the same channel $CH_{37+j}$, and if in step E4a the response signal "SCAN_REQUEST" has been received on each of the three channels $CH_{37}$, $CH_{38}$ and $CH_{39}$, i.e., if j>2, then Steps E5b and Ebb: reduction of the transmission power of the "ADV-IND" signal, i.e., P=P–×N, with i=1 and, for example, N=2 dB, and storage of the new transmission power P which is hence reduced by 2 dB in relation to the initial transmission power P=X, and Step E7b: repetition of steps E2 through E4a, i.e., sending of the "ADV_IND" signal on a first signal $CH_{37}$ (i.e., j=0) with a reduced transmission power P=(X−2) dB, if not, if the response signal has been received on only one channel, then:

Step E5a: repetition of steps E2 through E4a for the other two channels, i.e., j=j+1, and if not
repetition of steps E2 through E4a for each channel.

If not, if the response signal "SCAN_REQUEST" has not been received by the detection device 10 on one of the channels (step E3), then in step E4c a difference is calculated between a predetermined threshold transmission power $P_T$ and the last transmission power stored, i.e., $\Delta = P_T - (i-1) \times N$. Then in step E5c a correction is applied to the transmission power of the signal that is sent by the detection device during the second communication mode based on the difference thus calculated. Preferably, the correction is equal to the calculated difference.

The second communication mode making it possible to detect the portable device SD then begins with the transmission power thus corrected.

In this first mode, the detection device sends the "ADV_IND" signal and waits for a response signal from the portable device "SCAN_REQUEST."

In a second embodiment of an aspect of the present invention, and shown in FIG. 7, the signaling mode is triggered by the portable device SD.

The portable device 10 transmits the "ADV_IND" signal on a first channel $CH_{37+j}$, for example, j=0 (step E1a) and triggers the starting of a clock, T=0.

Upon reception of the "ADV_IND" signal, the detection device responds by transmitting a "SCAN_REQUEST" (or "SCAN_REQ") signal on the same channel at a predetermined transmission power P, P=X (step E2) in decibels;

In step E3, as long as the detection device 10 is receiving a response signal from the portable device SD, i.e., as long as the detection device 10 is receiving the "SCAN_RESPONSE" (or "SCAN_RESP") signal from the portable device SD on the same channel $CH_{37+j}$, in step E4a the response signal "SCAN_RESPONSE" has been received on each of the three channels $CH_{37}$, $CH_{38}$ and $CH_{39}$, i.e., if j>2, then Steps E5b and Ebb: reduction of the transmission power of the "SCAN_REQUEST" signal, i.e., P=P–i×N, with i=1 and, for example, N=2 dB, and storage of the new transmission power P that is hence reduced by 2 dB in relation to the initial transmission power P=X, and Step E7b: repetition of steps E2 through E4a, i.e., sending of the "SCAN_REQ" signal on a first signal $CH_{37+j}$ (i.e., j=0) with a reduced transmission power P=(X−2) dB, if not, if the response signal has been received on only one channel, then:

Step E5a: repetition of steps E2 through E4a for the other two channels, i.e., j=j+1, and if not
repetition of steps E2 through E4a for each channel.

If not, if the response signal "SCAN_RESPONSE" has not been received by the detection device 10 on one of the channels, then in step E4c a difference is calculated between a predetermined threshold transmission power $P_T$ and the last transmission power stored, i.e., $\Delta = P_T - (i-1) \times N$. Then in step E5c a correction is applied to the transmission power of the signal that is sent by the detection device during the second communication mode based on the difference thus calculated. Preferably, the correction is equal to the calculated difference.

In this second mode, the detection device sends the "SCAN_REQUEST" signal and waits for the response signal "SCAN_RESPONSE."

In this second embodiment of an aspect of the present invention, the portable device SD initializes the signaling mode and triggers a clock. The detection process continues as long as the clock of the portable device SD does not measure a time greater than a predetermined time Timer.

In the first embodiment, the detection device 10 continues to send the "ADV_IND" signal to the portable device SD while reducing the transmission power of said signal until the sensitivity of the portable device SD no longer permits it to receive the signal and hence until said portable device SD no longer responds to the detection device 10. The absence of response ends the detection process, and the detection device can thus calculate the sensitivity of the portable device SD based on the last value of the stored transmission power.

In the second embodiment, the signaling mode is triggered and is controlled by the portable device SD. The detection device 10 in turn responds to the "ADV_IND" signal as long as it is receiving said signal and measures the sensitivity of the portable device SD, voluntarily degrading the transmission power of the "SCAN_REQUEST" signal that it sends. When the transmission power of the "SCAN_REQUEST" signal is too low and when the sensitivity of the portable device SD does not make it possible to receive said message, the detection device 10 can then determine the sensitivity of the portable device SD by calculating a difference between the last transmission power value stored and a predetermined transmission power.

However, in the second embodiment, the detection device 10 not having triggered the signaling mode, the detection process is ended once the predetermined time Timer has expired, said time being measured by the clock of the portable device SD, whether the detection is finished or not.

The threshold transmission power $P_T$ is determined in advance as a function of the predetermined distance that separates the detection device 10 from the portable device SD when it is put in step E0.

For example, the portable device is put in step E0 on the inside of the vehicle, for example, at 50 cm from the detection device 10.

A threshold transmission power $P_T$, for example, equal to −66 dB, measured by the detection device 10 during a prior calibration phase by means of a portable device SD having a reference sensitivity or a nominal sensitivity, corresponds to this positioning distance which is equal to 50 cm.

A transmission power of −66 dB transmitted by the detection device 10 and received by the portable device SD hence means a positioning of a portable device SD having a nominal sensitivity at 50 cm from said device.

If, at the end of the detection procedure, the last transmission power stored by the detection device 10 is equal to −72 dB, i.e., beyond which the portable device SD is no longer responding, this means that the distance estimated by the detection device 10 between the detection device 10 and the portable device SD is greater than 50 cm, for example, equal to 70 cm, when the latter is located in reality 50 cm from the detection device 10 (i.e.: predetermined distance).

In this case, the sensitivity of the phone is equal to:

$$\Delta = -66 - (-72) = +6 \text{ dB}.$$

This correction of +6 dB is then applied to the transmission power of the signals sent by the detection device 10 during the communication phase in order to correct the sensitivity of the portable device SD.

Inversely, if at the end of the detection procedure, the last transmission power stored is equal to −63 dB, this means that the distance estimated by the detection device 10 between the detection device 10 and the portable device SD is less than 50 cm, for example, equal to 40 cm, when in reality the portable device is clearly located at 50 cm (predetermined distance).

In this case, the sensitivity of the phone is equal to:

$$\Delta = -66 - (-63) = -3 \text{ dB}.$$

This correction of −3 dB is then applied to the value of the transmission power of the signals sent by the detection device 10 during the communication phase in order to correct this deviation in sensitivity of the portable device SD.

Due to the sensitivity correction applied by the detection device 10 to the transmission of signals to the portable device SD, the latter may then estimate the position of the portable device SD in relation to the vehicle V (i.e., in relation to the detection device 10) in a precise manner during the communication phase that follows.

An aspect of the present invention is ingenious insofar as the correction of the sensitivity of the portable device SD is measured and applied by the detection device 10 and not by the portable device SD itself.

An aspect of the present invention is all the more practical to implement because the detection process takes place during the BLE signaling phase without specific necessary action by the user.

The process for the detection of the presence of the portable device SD in a predetermined zone according to an aspect of the present invention, whether it is triggered by the detection device 10 or by the portable device SD, therefore comprises the following steps:

prior positioning of the portable device SD at a predetermined and fixed distance from the detection device 10, transmission of a signal (either "ADV_IND" or "SCAN_REQUEST") by the detection device 10 with a predetermined transmission power P on a channel $CH_{37}$ (for example), as long as the detection device 10 is receiving from the portable device SD a signal of response (either "SCAN_ REQUEST" or "SCAN_RESPONSE") to said signal on said channel $CH_{37}$, then repetition of the transmission of the signal (either "ADV_IND" or "SCAN_REQUEST") at the same transmission power P on the other two channels $CH_{38}$, $CH_{39}$; if not, reduction of the transmission power of the signal (P=P−i×N) and repetition of the transmission of the signal (either "ADV_IND" or "SCAN_REQUEST") on a channel, for example, on the first channel $CH_{37}$ with said reduced transmission power, if the detection device 10 is no longer receiving a response signal (either "SCAN_REQUEST" or "SCAN_RESPONSE") on at least one channel ($CH_{37}$, $CH_{38}$, $CH_{39}$) from the portable device SD, then the transmission power P of the last signal sent by the detection device is compared to a predetermined threshold transmission power $P_T$, and as a function of the result of said comparison, a correction $\Delta = P_T - (i-1) \times N$ is applied to the transmission power of the signals sent by the detection device 10 during the second communication mode in order to detect the presence of the portable device SD in a predetermined zone.

In a preferred embodiment of the detection process according to an aspect of the present invention, the portable device SD is positioned on the inside of the vehicle V.

The predetermined distance may be such that the portable device SD is positioned on the outside of the vehicle V. In this case, the corresponding predetermined transmission power $R_T$ is, of course, measured in advance at this distance with a portable device SD having a nominal sensitivity or a reference sensitivity.

An aspect of the present invention also pertains to a detection device 10 and to a portable device SD that are suitable for implementing an aspect of the present invention.

In this case, the detection device according to an aspect of the present invention comprises:

means for reduction M1 of the transmission power P of the signal sent for the portable device, either of the "ADV_IND" signal for the first embodiment or of the "SCAN_REQUEST" signal for the second embodiment, the means of reduction M1 of the transmission power being a function of the response of the portable device SD received by the detection device 10, means for storage M2 of the transmission power P of said signal, means for calculation M3 of a difference Δ between the last transmission power P stored and a predetermined threshold transmission power $P_T$, said calculation means M3 being dependent on the detection by the detection device 10 in the absence of a response from the portable device SD, and means for correction M4 of the power of the signal Pe during the second communication mode based on the difference Δ thus calculated.

The means for reduction M1 of a transmission power of the signal, the means for storage M2 of the transmission power, the means for calculation M3 of a difference between the stored transmission power and a predetermined threshold transmission power, the means for correction M4 of a transmission power of the signal during the second communication mode based on the difference thus calculated are in the form of software integrated in a microcontroller 100 (cf. FIG. 8).

The detection device 10, being suitable for BLE communication with a portable device SD, as explained above, comprises all the software means necessary for the signaling mode and for the communication mode.

In this case, the detection device 10 comprises means for transmission and reception of BLE signals, for processing said signals, and means for stopping the BLE communication when it is no longer receiving a response from the portable device SD. The detection device 10 is equipped with means for detection of the absence of a response from the portable device SD.

The portable device is also suitable for BLE communication and according to an aspect of the present invention also comprises a clock H in order to stop the signaling mode after a predetermined time Timer.

However, it is also possible to not fix a predetermined time, the signaling mode continuing as long as the communication mode is not triggered.

Therefore, an aspect of the present invention practically makes it possible, by using the signaling mode specific to the BLE communication, to measure the reception sensitivity of the BLE signal of the portable device and thus to adapt the transmission power of the signal sent by the detection device as a function of this sensitivity, during the second communication mode. This makes it possible to assure that the portable device SD is correctly positioned in a predetermined zone of the vehicle and that the corresponding and adequate vehicle functions can be activated.

The invention claimed is:

1. A process for the detection of the presence of a portable user device in a predetermined zone on the inside of or on the outside of a vehicle by ultra high frequency by a detection device onboard the vehicle, a high-frequency, Bluetooth Low Energy type communication comprising two modes, a first signaling mode, comprising:

transmitting by the detection device at least one signal repeated successively on at least one of three channels and at a fixed frequency for the portable device and requesting a response signal from the portable device on at least one of the three channels, a said second communication mode, in which data are exchanged between the detection device and the portable device on only one dedicated channel, positioning the portable device at a predetermined and fixed distance from the detection device, transmission of the signal by the detection device with a predetermined transmission power on a channel, as long as the detection device is receiving from the portable device a signal of response to said signal on said channel, then repeating the transmission of the signal at the same transmission power on the other two channels, if the response signal has been received on each of the three channels, then reducing the transmission power of the signal and repeating the transmission of the signal for each channel, with said reduced transmission power, and, if the detection device is no longer receiving a response signal on at least one channel from the portable device, then comparing the transmission power of the last signal sent by the detection device to a predetermined threshold transmission power, and as a function of the result of said comparison, applying a correction to the transmission power of the signals sent by the detection device during the second communication mode in order to detect the portable device in a predetermined zone.

2. The detection process in accordance with claim 1, wherein the threshold transmission power is determined in advance as a function of the predetermined distance.

3. The detection process in accordance with claim 1, wherein the positioning is carried out on the inside of the vehicle.

4. The detection process in accordance with claim 1, further comprising, after the prior positioning of the portable device and before the step of transmission of the signal by the detection device with a predetermined transmission power:

transmitting a first signal by the portable device, and receiving said first signal by the detection device, the detection process being repeated for each channel, as long as a predetermined time (Timer) has not expired.

5. The detection process in accordance with claim 1, further comprising:

Step E0: positioning of the portable device at a predetermined and fixed distance from the detection device, Step E2: transmitting the signal on a channel by the detection device at a predetermined transmission power, Step E3: as long as the detection device is receiving a response signal from the portable device on the same channel, then Step E4a: if the response signal has been received on each of the three channels, then Steps E5b and Ebb: reduction of the transmission power of the signal and storage of the new transmission power, and Step E7b: repetition of steps E2 through E4a with the new transmission power, if not, if the response signal has been received on one channel, then Step E5a: repetition of steps E2 through E4a for the other two channels, if not, if the detection device has not received a response signal, then:

Step E4c: if the detection device does not receive a response signal, then calculation of a difference between a predetermined threshold transmission power and the last stored transmission power, and Step E5c: correction of the transmission power of the signal during the second communication mode based on the difference thus calculated.

6. The detection process in accordance with claim 5, wherein the threshold transmission power is determined in advance as a function of the predetermined distance.

7. The detection process in accordance with claim 5, wherein it additionally comprises, after step E0, a prior step of transmission of a first signal by the portable device on a channel, and in that step E2 comprises a response from the detection device to the portable device by the transmission of the signal on the same channel, and the detection process being repeated for each channel, as long as a predetermined time has not expired.

8. A device for detecting the presence of a portable device in a predetermined zone, intended to be onboard a vehicle, comprising Ultra High Frequency communication means, with said portable user device, a high-frequency, Bluetooth Low Energy type communication comprising two modes, a first signaling mode comprising transmission by the detection device of at least one signal comprising a same message repeated successively on at least one of three channels and at a fixed frequency for the portable device and requesting a response signal from the portable device on at least one of the three channels, a second communication mode, in which data are exchanged between the detection device and the portable device on only one dedicated channel, said device comprising:

means for reduction of a transmission power of the signal,
means for storage of the transmission power,
means for calculation of a difference between the last transmission power stored and a threshold transmission power predetermined in advance as a function of a predetermined distance between the portable device and the detection device, and
means for correction of a transmission power of the signal during the second communication mode, making it possible to estimate the position of the portable device in relation to the vehicle based on the difference thus calculated.

9. A detection device in accordance with claim 8, wherein the means for reduction of a transmission power of the signal, the means for storage of the transmission power, the means for detection of the transmission of the signal on each of the three channels at the same power, the means for calculation of a transmission power of the signal during the second communication mode based on the difference thus calculated being in the form of software integrated in a microcontroller.

10. A system comprising a detection device in accordance with claim 8 and a portable user device.

11. A motor vehicle, comprising a detection device in accordance with claim 8.

12. The detection process in accordance with claim 2, wherein the positioning is carried out on the inside of the vehicle.

13. A system comprising a detection device in accordance with claim 9 and a portable user device.

14. A motor vehicle, comprising a detection device in accordance with claim 9.

* * * * *

UNITED STATES PATENT AND TRADEMARK OFFICE
CERTIFICATE OF CORRECTION

PATENT NO. : 11,203,323 B2  
APPLICATION NO. : 16/461040  
DATED : December 21, 2021  
INVENTOR(S) : Sylvain Godet et al.

Page 1 of 1

It is certified that error appears in the above-identified patent and that said Letters Patent is hereby corrected as shown below:

On the Title Page

Item (71) Applicants, "Continental Automotive GmbH, Hanovre (DE)" should be -- Continental Automotive GmbH, Hannover (DE) --.

In the Claims

Column 14, Claim 5, Line 53, "Ebb" should be -- E6b --.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*